United States Patent [19]

Tise et al.

[11] Patent Number: 5,512,622
[45] Date of Patent: Apr. 30, 1996

[54] DILUTION-ENHANCING ADDITIVES FOR PUBLICATION GRAVURE VEHICLES

[75] Inventors: Frank P. Tise, New Castle County; Jennifer Weatherdon, Kent County, both of Del.

[73] Assignee: Hercules Incorporated, Wilmington, Del.

[21] Appl. No.: 341,248

[22] Filed: Nov. 17, 1994

[51] Int. Cl.⁶ .................................................. C08L 93/04
[52] U.S. Cl. ........................ 524/272; 524/270; 524/271
[58] Field of Search ................................ 523/160, 161; 524/270, 271, 274, 272

[56] References Cited

U.S. PATENT DOCUMENTS

| | | | |
|---|---|---|---|
| 4,077,935 | 3/1978 | Wszolek | 524/559 |
| 4,198,329 | 4/1980 | Rudolphy et al. | 260/24 |
| 4,207,219 | 6/1980 | Rudolphy | 260/25 |
| 4,244,866 | 1/1981 | Schefbauer | 524/270 |
| 4,250,066 | 2/1981 | Schefbauer | 260/25 |
| 4,528,036 | 7/1985 | Rudolphy | 106/30 |
| 4,566,997 | 1/1986 | Satoh et al. | 260/105 |
| 4,690,712 | 9/1987 | Janusz et al. | 106/30 |
| 4,767,835 | 8/1988 | Janusz | 527/600 |
| 5,026,753 | 6/1991 | West et al. | 524/270 |
| 5,026,754 | 6/1991 | Pavlin | 524/270 |
| 5,082,497 | 1/1992 | LeVine | 106/30 |
| 5,085,699 | 2/1992 | Hutter | 524/272 |
| 5,098,479 | 3/1992 | Hutter | 524/272 |
| 5,137,977 | 8/1992 | Saitoh et al. | 525/282 |
| 5,166,256 | 11/1992 | Boswell et al. | 524/576 |
| 5,166,257 | 11/1992 | Boswell et al. | 524/576 |
| 5,166,258 | 11/1992 | Boswell et al. | 524/576 |
| 5,166,262 | 11/1992 | Boswell et al. | . |
| 5,180,424 | 1/1993 | Hutter | 106/20 |
| 5,180,774 | 1/1993 | LeVine | . |
| 5,189,089 | 2/1993 | Hollis et al. | 524/274 |
| 5,552,592 | 11/1995 | Rudolphy et al. | 106/30 |

OTHER PUBLICATIONS

F. W. Billmeyer, Jr., Textbook of Polymer Science, 1962, p. 374

*Primary Examiner*—Peter A. Szekely
*Attorney, Agent, or Firm*—Robert P. O'Flynn O'Brien

[57] ABSTRACT

A resinous binder formulation is disclosed which relates to binders containing dilution-enhancing polymers for "letdown" metal resinate vehicles in publication gravure printing inks. The resinous binder comprises a metal resinate, and a dilution-enhancing polymer selected from the group consisting of polymers of maleic anhydride and ethylene and polymers of acrylonitrile, butadiene, acrylic acid and/or methacrylic acid. The dilution-enhancing polymer being present in the resinous binder in an amount which is effective to increase the dilution of the resinous binder in aromatic and nonaromatic solvents.

Also disclosed is a publication gravure ink comprising a mixture of a solvent, a colorant and the resinous binder.

53 Claims, No Drawings

DILUTION-ENHANCING ADDITIVES FOR PUBLICATION GRAVURE VEHICLES

FIELD OF THE INVENTION

The invention relates to resinous binders and their use in publication gravure printing inks. More specifically, the invention relates to resinous binder formulations containing dilution-enhancing polymers for publication gravure printing inks.

BACKGROUND OF THE INVENTION

Publication gravure printing inks generally comprise mixtures of a resinous binder, a colorant, and a solvent. In ink formulations, resinous binders are commonly used to provide certain physical properties to the ink which permit processing and use of the ink in publication gravure printing presses.

in a typical ink formulation, the colorant is provided in the form of a base grind which is a concentrated dispersion of colorant, typically in the form of a pigment, and a metal resinate vehicle. The base grind is extended, i.e., "let down" through the use solutions of resinous binders which adjust the base grind to a desired concentration in the ink.

These solutions, also known as "let-down vehicles", typically comprise metal resinates in a solvent. Amongst the desired properties that let-down vehicles impart to ink formulation are improved rub resistance, drying and blocking resistance.

A key property of a let-down vehicle, and one which in the past has proven difficult or expensive to provide, is the let-down vehicle's "solvent dilution ratio", often called merely its "dilution" or "dilutability". Dilution is defined herein as a measure of the vehicle's relative insensitivity to viscosity reduction as more solvent is added to an ink. Inks based on vehicles with high dilution may be cut with more solvent to bring the ink to a desired print viscosity. This property permits production of more economical inks since solvent is a relatively inexpensive component in inks.

It is desirable that the let-down vehicle contained in the ink formulation be effective in both solvents with a high aromatic content, typically toluene, as well as those solvents with a relatively high aliphatic (i.e. low aromatic) content, since substantial amounts of both types of solvents are used in the printing industry.

Hydrocarbon solvent solutions of metal resinates (e.g. calcium, zinc, magnesium, sodium, potassium, lithium, and/or aluminum salts of rosin or modified rosin) while inexpensive cannot normally be used exclusively to obtain let-down vehicles with the desired dilution. The limited molecular weights which are obtained by the reaction of metals with modified rosins results in vehicles with relatively low dilution.

High molecular weight polymeric additives have been added to metal resinate solutions to increase the dilution of the vehicle. However, these additives tend to increase the viscosity of the metal resinate solutions beyond the capabilities of ink manufacturer to pump the solutions. Such additives have limited utility in the printing industry.

Therefore, it is desirable to find a way to impart appropriately high dilution to metal resinate solutions, without causing too great an increase in viscosity, and without seriously impairing any of the other performance-related properties of the vehicle. These include, for instance, proper ink performance in terms of gloss, drying, blocking resistance, resistance to viscosity change upon storage, and resistance to bronzing and loss of pigment color strength.

There have been numerous efforts in the past to prepare metal resinate vehicles as binders with high dilutions. Some of these efforts have been successful in preparing metal resinate vehicles with high dilutions, however these metal resinate vehicles suffer from various disadvantages.

U.S. Pat. No. 5,026,753 to West et al. teaches addition of various carboxylated polystyrene resins to metal resinate vehicles, thereby imparting improved dilution to the vehicle without incurring an excessively high vehicle viscosity. This patent teaches that the most preferred polymers are styrene-maleic anhydride (SMA) copolymers. However, SMA copolymers are not effective in the full range of publication gravure solvents presently in use in the printing industry. In particular, SMA copolymers have poor solubility in vehicles employing solvents with aromatic content below about 85%. The use of these solvents is extensive in the industry, and the inability to use the SMA resins in these solvents is a distinct disadvantage. In addition, there is a degree of viscosity instability for resinate vehicles using this technology.

Similarly, U.S. Pat. No. 5,026,754 to Pavlin teaches dilution improvement by addition of various tertiary amine-containing polymers to metal resinate vehicles. However, polymers taught in this patent are not commercially available, and thus not feasible from a commercial perspective.

U.S. Pat. Nos. 5,189,089 and 5,098,479 to Hutter teach the use of amine-containing polymeric additives, but these patents also teach that these amine-containing polymeric additives are of use only in the case of zinc-containing metal resinates. Although many commercial metal resinate vehicles contain zinc, not all do. The presence of zinc is well known in the printing art to create stability problems for yellow inks, therefore the use of zinc containing resinate vehicles is to be avoided in applications containing yellow inks. Therefore, the teachings of these patents are not applicable to the full range of commercial resinate formulations.

U.S. Pat. No. 5,189,089 to Hollis et al. teaches use of ethylene-vinyl acetate copolymers as dilution enhancers for metal resinate gravure vehicles. However, the resulting dilution is relatively low when compared to other metal resinate let-down vehicles. More importantly, ethylene-vinyl acetate copolymers are not effective in vehicles in which the solvent is pure toluene, or has a relatively high toluene content. This eliminates their use in a large percentage of potential applications.

U.S. Pat. No. 4,244,866 to Schefbauer teaches use of alpha olefin/maleic anhydride copolymers and partial esters thereof, but does not teach any improvement in dilution from their use. Moreover, the low molecular weight, high acid number polymers described therein need to be used in relatively high amounts, around 10%, and, in fact, are not readily soluble in toluene which is a solvent commonly used for publication gravure printing. Thus, it is necessary to use methyl ethyl ketone, a cosolvent not employed in the industry.

Amongst the objectives of the instant invention is provision of a binder which may be used in either solvent systems having high-aromatic content and solvent systems having low-aromatic content, without requiring use of ketones or other cosolvents not generally accepted for use in the industry. Another objective of the instant invention is provision of a dilution-enhancing polymer whose efficacy is not dependent on the presence of zinc, a known cause of instability in inks having yellow pigments. Another objective of the instant invention is provision of a dilution-enhancing polymer which effectively imparts appropriately high dilution to metal resinate solutions in relatively small amounts, thereby saving cost and reducing potential for reduction of desirable properties of the metal resinate component.

SUMMARY OF THE INVENTION

A resinous binder is disclosed comprising;

(a) a metal resinate, and (b) a dilution-enhancing polymer selected from the group consisting of polymers of maleic anhydride and ethylene and polymers of acrylonitrile, butadiene, acrylic acid and/or methacrylic acid. The dilution-enhancing polymer is in the resinous binder in an amount which is effective to increase dilution of the resinous binder in aromatic solvents and in nonaromatic solvents as compared to the dilution of the metal resinate alone.

DETAILED DESCRIPTION OF THE INVENTION

Let-down resins or binders are prepared essentially through the formation of a metal salt (typically calcium, zinc, magnesium, sodium, potassium, lithium, and/or aluminum) of rosin, modified rosin and/or resins based on polymerizable hydrocarbon distillate feedstocks.

Metal resinates which comprise a portion of the binders disclosed in this invention are well known in the art. Typically, but not exclusively, metal resinates are zinc, calcium, magnesium, potassium, sodium, lithium, and/or aluminum salts of modified rosins. These modified rosins, in turn, are typically obtained by reacting rosin, dimerized rosin, and/or polymerized rosin (gum, tall oil, or wood) and/or resins based on polymerizable hydrocarbon distillate feedstocks with maleic anhydride, fumaric acid, acrylic acid and/or phenol-formaldehyde resins (or a phenol and a formaldehyde source). Examples of such metal resinates are to be found in U.S. Pat. Nos. 4, 198,329, 4,528,036 and 4,552,529, all of which are hereby incorporated in their entireties by reference hereto. Formation of the metal resinate may be performed while the material is in a melt or while in solution. Techniques for preparing such materials are widely known to those skilled in the art.

Dilution-enhancing polymers which constitute a portion of the binders of this invention are of two types.

A first type of dilution-enhancing polymers comprise copolymers of maleic anhydride and ethylene, optionally also containing acrylic esters, and the corresponding polymers obtained via hydrolysis of the anhydride groups to give carboxylic acid functionality. The polymers must have a weight average molecular weight of at least about 20,000 Daltons, and contain between approximately 0.5% and 15% maleic anhydride-based units by weight. A preferred polymer is one containing about 73% ethylene, 24% ethyl acrylate, and 3% maleic anhydride-based units, and having a weight average molecular weight of approximately 60,000 Daltons. Although anhydride-containing polymers are useful as dilution enhancers when added to a metal resinate solution after the resinate formation reaction, anhydride-containing polymers are most active when added to the metal resinate solution in a reaction solvent in the presence of water, prior to addition and reaction with metal oxides/hydroxides.

In addition to modification of maleic anhydride-ethylene copolymers with acrylic esters as mentioned above, modification can also be achieved with one or more other monomers including, but not limited to, acrylic acid, acrylamide, acrylonitrile, methacrylic acid, methacrylic esters, styrene, alkyl styrenes, isoprene, butadiene, cyclopentadiene, and alpha-olefins.

Also, any of the above-mentioned anhydride-containing polymers can be modified by reaction of some or all of the anhydride groups with alcohols and/or amines, to afford 1,4-acid ester and/or 1,4-acid amide functionality. Modifying materials may be selected from the group consisting of alcohols, amines, amino alcohols, carboxy-substituted amines, carboalkoxy-substituted amines, carboxy-substituted alcohols, carboalkoxy-substituted alcohols, phenols and polymers having alcohol, amine, amino alcohol, carboxy-substituted amine, carboalkoxy-substituted amine, carboxy-substituted alcohol, carboalkoxy-substituted alcohol or phenol functional groups.

A second type of dilution-enhancing polymers which constitute a portion of the binders of this invention are polymers comprising acrylonitrile, butadiene, and acrylic and/or methacrylic acid. The polymers must have a Mooney viscosity at 100° C. of at least 20, and contain between approximately 0.5% and 15% acrylic and or methacrylic acid units by weight. A preferred polymer is one containing about 27% acrylonitrile, 66% butadiene, and 7% methacrylic acid units, and having a Mooney viscosity of 37, (Mooney viscosity as determined by ASTM D 1646-93 using a Mooney Viscometer at 100° C. with 1 minute warm-up and 4 minute run time).

These dilution-enhancing polymers have the further advantage in that they can be introduced at any time during the process with equal effectiveness, since active acid groups are present on the polymer from the start. Additionally, these polymers can be modified by inclusion of one or more other monomers including, but not limited to, acrylamide, acrylic and methacrylic esters, styrene, alkyl styrenes, isoprene, cyclopentadiene, and alpha-olefins.

The dilution-enhancing polymers of the instant invention comprise a portion of the binder. The majority of the binder comprises a metal resinate, the various types of which are well known to those skilled in the art. The particular type of metal resinate is not critical to the present invention. Rather, it is the dilution-enhancing polymer present at relatively low levels in the binder which affords an increase in dilution ratio. A strong dilution-enhancing capability is a valuable characteristic in a polymer, since this keeps ink costs low as well as aids in the maintenance of the beneficial properties of the metal resinate (e.g. high softening point, fast solvent release). Thus typically, the dilution-enhancing polymer comprises from about 0.1% to 15% of the binder. The remainder of the binder is comprised mainly of metal resinate. Most preferably, the dilution-enhancing polymer content is from about 0.4% to about 7% of the binder.

Preparation of the binder is conveniently performed in a hydrocarbon solvent such as those used for commercial publication gravure ink formulation. Typical solvents may be selected from the group consisting of toluene, lactol spirits, and VM&P naphtha, or mixtures thereof.

Dilution of samples were determined as the volume in mLs of toluene/100 g of sample needed to reduce the sample's viscosity to 18 seconds on a #2 Shell cup, as determined using ASTM Method D4212-88, Viscosity by Dip-type Viscosity Cups. A sample is considered to have a relatively high dilution when 90 mLs or more of toluene/100 g of vehicle are needed to reduce its viscosity to 18 seconds on the #2 Shell cup in the above-described method.

Resinate viscosity was measured by the Gardner-Holdt Method, a bubble rise determination well known to those skilled in the art.

In a preferred embodiment of the invention, a resinate is modified with about (solids basis) of a dilution-enhancing polymer to give about a 50% solids publication gravure vehicle in toluene having a dilution of approximately 105 mLs of toluene per 100 grams of vehicle to an 18-second viscosity on a #2 Shell cup, starting from a viscosity of Gardner Z.

Publication gravure inks of this invention may comprise mixtures containing one (or more) of the binders of this invention, a solvent such as those noted above, a colorant, and (optionally) minor amounts of additives such as waxes and esters of modified rosin. A typical composition contains from about 20 to about 30% binder, about 5 to about 10% colorant, and about 60 to about 75% solvent. The proportions of the composition are designed to provide the desired gloss, color density, resistance to rub-off, and printing viscosity.

The colorant may be an organic or inorganic pigment, as well as a soluble dye. The colorant may be any of the known pigments used in publication gravure inks, such as carbon black, iron blue complexes, barium lithol reds, azo yellows, phthalocyanines, or any other desired pigments of the types customarily used in such inks. The colorant can be added as such, or predispersed in a liquid resinate medium to make an ink base as is commonly practiced in ink formulations.

Methods of formulating gravure inks of the type described herein are well known in the art. Most commonly, colorant in the form of pigment is dispersed in a solution of metal resinate in a hydrocarbon solvent, to provide a pigment concentrate ("base grind"). To the base grind, a solution of the binder of this invention in a solvent is added plus sufficient solvent to reduce the final ink formulation to an acceptable print viscosity.

Additional components may be present in the inks of the instant invention, such as dispersing agents, surfactants, odorants and the like.

The following examples are provided to further illustrate the present invention and are not to be construed as limiting the invention in any manner. All units, percentages, etc. are by weight unless otherwise indicated.

EXAMPLE 1

A resin kettle apparatus having a five neck kettle head equipped with an overhead stirrer attached to a glass stir rod with a polytetrafluoroethylene (ptfe) half-moon paddle, a water-jacketed Friedricks condenser, a nitrogen inlet, a thermometer connected to a temperature controller, an addition port with a stopper and a two-liter resin kettle was used to prepare the binder solutions. The kettle was charged with 300g of modified rosin (tall oil rosin, reacted with 1% of formaldehyde and 5% of fumaric acid, with an acid number of 200 and a Ring & Ball softening point of 85° C.) (Pamite 3327, available from Hercules Incorporated, Hattisburg, Miss.), 7.86 g of a dilution-enhancing polymer containing approximately 73% ethylene, 24% ethyl acrylate, and 3% maleic anhydride by weight and having an weight average molecular weight of 60,000 Daltons and an acid number of 17 (Lotader 6600, a product sold by Elf Atochem, North America, Philadelphia, Pa.), and 259 g toluene. This mixture was heated to 90° C. for 1 hour to dissolve the modified rosin and polymer. Ten (10 g) grams of water were added and the mixture brought to reflux at 95° C. for 1 hour to allow for hydrolysis of the polymer. Zinc oxide (5.7 g) was added and the mixture continued to reflux at 95° C. for 30 minutes. A slurry of calcium hydroxide (28.5 g) in toluene (50 g) was then added with continued reflux for a further 30 minutes. The mixture was then heated to 112° C. over 1 hour and 30 minutes, during which time water was removed by azeotropic distillation with toluene. After the azeotropic distillation was completed, the resultant binder solution had a viscosity of Z–Z1 on the Gardner scale at a solids content of 50.4%. Toluene dilution to 18 seconds on a #2 Shell cup (print viscosity) of this resinate was 112 mLs, starting with 100 g of the resinate solution.

COMPARATIVE EXAMPLE 1

A resinate was prepared generally according to the procedure in Example I but without the use of the dilution-enhancing polymer. The relative proportions of metals to modified rosin were maintained to give the same level of neutrality, and the resultant resinate had a viscosity of X on the Gardner scale at 50.5% solids. Toluene dilution of this resinate was only 74 mLs.

COMPARATIVE EXAMPLE 2

A resinate was prepared generally as in Example 1 except the ethylene-ethyl acrylate-maleic anhydride polymer was replaced with 6.6 g (2% based on solids) of a maleic anhydride modified styrene-ethylene/butylene-styrene block copolymer with a weight average molecular weight of 50,000 Daltons and an acid number of 19.4, (Kraton FG 1901X, sold by Shell Chemical Company, Oak Brook, Ill.). The resultant resinate had a Gardner Viscosity of R at 50.0% solids and dilution ratio of only 72 mLs.

EXAMPLE 2

A resinate was prepared generally as in Example 1 except that the ethylene-ethyl acrylate-maleic anhydride copolymer was added after the azeotropic removal of water and allowed to mix at 110° C. for 30 minutes. This resinate had a Gardner viscosity of X–Y at 50.0% solids and a toluene dilution of 94 mLs.

EXAMPLE 3

A resinate was prepared generally as in Example I except that the toluene was replaced by a commercially available gravure "recovered solvent" containing 53% toluene, with the balance being a combination of aliphatic hydrocarbons such as lactol spirits, available from Unocal Corporation, Schaumburg, Il, and VM&P Naphtha, available from Ashland Chemical, Columbus, OH. This resinate had a Gardner viscosity of Z2 at 50.3% solids and a toluene dilution of 105 mLs.

EXAMPLE 4

A resinate was prepared generally as in Example 1 except using an ethylene-ethyl acrylate-maleic anhydride copolymer with a weight average molecular weight of 80,000 Daltons and maleic anhydride content of about 1.5% (Lotader 4700, sold by Elf Atochem) at a concentration of 1% in the final product. This resinate had a Gardner viscosity of Z-Z1 at 49.4% solids and a toluene dilution of 107 mLs.

EXAMPLE 5

A resinate was prepared as in Example 1 and monitored for viscosity and dilution stability over time. After an initial small increase in viscosity and dilution, the product substantially maintained its viscosity and dilution for a period of three months at ambient temperature, as shown in Table 1.

TABLE 1

| Age of sample | Gardner Viscosity | Toluene Dilution (mLs) |
|---|---|---|
| Original | Z | 100 |
| 24 hours | Z – Z1 | 106 |
| 2 weeks | Z1 – Z2 | 107 |
| 1 month | Z1 + ¼ | 105 |
| 2 month | Z1 – Z2 | 105 |
| 3 months | Z1 – Z2 | 107 |

EXAMPLE 6

A resinate was prepared generally as in Example I except that the ethylene-ethyl acrylate-maleic anhydride copolymer was replaced with 6.53 g of a dilution-enhancing copolymer containing about 27% acrylonitrile, 66% butadiene, and 7% methacrylic acid units and having a Mooney viscosity at 100° C. of 37 (Krynac X7.40, sold by Polysar Rubber Corporation, Sarnia, Ontario, Canada). This resinate had a Gardner viscosity of Y-Z at 49.5% solids and a toluene dilution of 102 mLs.

EXAMPLE 7

A resinate was prepared generally using the procedure of Example 1 and formulation of Example 6 except that the copolymer was added after the azeotropic removal of water and allowed to mix at 110° C. for 30 minutes. This resinate had a Gardner viscosity of Z+½ at 49.2% solids and a toluene dilution of 101 mLs.

While the invention has been described and illustrated herein by reference to various specific materials, procedures and examples, it is understood that the invention is not restricted to the particular materials, combination of materials, and procedures selected for that purpose. Numerous variations of such details can be employed, as will be appreciated by those skilled in the art.

What is claimed is:

1. A resinous binder comprising;
   (a) a metal resinate, and
   (b) a dilution-enhancing polymer selected from the group consisting of
   copolymers of maleic anhydride and ethylene and copolymers of
   acrylonitrile, butadiene, acrylic acid and/or methacrylic acid, wherein the dilution-enhancing polymer is present in the resinous binder in an amount which is effective to increase dilution of the resinous binder in aromatic solvents and in nonaromatic solvents as compared to the dilution of the metal resinate alone.

2. The resinous binder of claim 1 wherein the dilution-enhancing polymer comprises copolymers comprising maleic anhydride and ethylene.

3. The resinous binder of claim 2 wherein the dilution-enhancing polymer further comprises carboxylic acid functionality obtained via hydrolysis of anhydride groups contained in the copolymers of maleic anhydride and ethylene.

4. The resinous binder of claim 2 wherein the dilution-enhancing polymer further comprises acid functionality obtained via modification of anhydride groups contained in the dilution-enhancing polymer through reaction with a modifying material, wherein the modifying material is selected from the group consisting of alcohols, amines, amino alcohols, carboxy-substituted amines, carboalkoxy-substituted amines, carboxy-substituted alcohols, carboalkoxy-substituted alcohols, phenols and polymers having alcohol, amine, amino alcohol, carboxy-substituted amine, carboalkoxy-substituted amine, carboxy-substituted alcohol, carboalkoxy-substituted alcohol or phenol functional monomer units.

5. The resinous binder of claim 2 wherein the dilution-enhancing polymer further comprises acrylic ester monomer units.

6. The resinous binder of claim 5 wherein the dilution-enhancing polymer further comprises carboxylic acid functionality obtained via hydrolysis of anhydride groups contained in the copolymers of maleic anhydride and ethylene.

7. The resinous binder of claim 5 wherein the dilution-enhancing polymer further comprises acid functionality obtained via modification of anhydride groups contained in the dilution-enhancing polymer through reaction with a modifying material, wherein the modifying material is selected from the group consisting of alcohols, amines, amino alcohols, carboxy-substituted amines, carboalkoxy-substituted amines, carboxy-substituted alcohols, carboalkoxy-substituted alcohols, phenols and polymers having alcohol, amine, amino alcohol, carboxy-substituted amine, carboalkoxy-substituted amine, carboxy-substituted alcohol, carboalkoxy-substituted alcohol or phenol functional groups.

8. The resinous binder of claim 5 wherein the dilution-enhancing polymer further comprises monomer units selected from the group consisting of acrylic acid, acrylamide, acrylonitrile, methacrylic acid, methacrylic esters, styrene, alkylstyrenes, isoprene, butadiene, cyclopentadiene and alpha-olefins.

9. The resinous binder of claim 2 wherein the dilution-enhancing polymer further comprises monomer units selected from the group consisting of acrylic acid, acrylamide, acrylonitrile, methacrylic acid, methacrylic esters, styrene, alkylstyrenes, isoprene, butadiene, cyclopentadiene and alpha-olefins.

10. The resinous binder of claim 2 wherein the dilution-enhancing polymer further comprises one or more monomers selected from the group consisting of acrylic acid, acrylamide, acrylonitrile, methacrylic acid, methacrylic esters, styrene, alkylstyrenes, isoprene, butadiene, cyclopentadiene and alpha-olefins.

11. The resinous binder of claim 2 wherein the dilution-enhancing polymer has a weight average molecular weight of at least 20,000 Daltons.

12. The resinous binder of claim 2 wherein the dilution-enhancing polymer further comprises between approximately 0.5% and 15% maleic anhydride-based units by weight.

13. The resinous binder of claim 5 wherein the dilution-enhancing polymer further comprises carboxylic acid functionality obtained via hydrolysis of anhydride groups contained in the copolymers of maleic anhydride and ethylene.

14. The resinous binder of claim 5 wherein the dilution-enhancing polymer further comprises acid functionality obtained via modification of anhydride groups contained in the dilution-enhancing polymer through reaction with a modifying material, wherein the modifying material is selected from the group consisting of alcohols, amines, amino alcohols, carboxy-substituted amines, carboalkoxy-substituted amines, carboxy-substituted alcohols, carboalkoxy-substituted alcohols, phenols and polymers having alcohol, amine, amino alcohol, carboxy-substituted amine, carboalkoxy-substituted amine, carboxy-substituted alcohol, carboalkoxy-substituted alcohol or phenol functional groups.

15. The resinous binder of claim 2 wherein the dilution-enhancing polymer comprises from about 0.1% to 15% of the resinous binder.

16. The resinous binder of claim 13 wherein the dilution-enhancing polymer comprises from about 0.4% to 7% of the resinous binder.

17. The resinous binder of claim 13 wherein the dilution-enhancing polymer comprises about 2% of the resinous binder.

18. The resinous binder of claim 3 wherein the dilution-enhancing polymer has a weight average molecular weight of at least 20,000 Daltons.

19. The resinous binder of claim 16 wherein the dilution-enhancing polymer comprises between approximately 0.5% and 15% maleic anhydride-based units by weight.

20. The resinous binder of claim 17 wherein the dilution-enhancing polymer comprises from about 0.1% to 15% of the resinous binder.

21. The resinous binder of claim 2 wherein the dilution-enhancing polymer comprises a copolymer of about 73% ethylene, 24% ethyl acrylate, and 3% maleic anhydride by weight and has a weight average molecular weight of approximately 60,000 Daltons.

22. The resinous binder of claim 19 wherein the dilution-enhancing polymer further comprises carboxylic acid functionality obtained via hydrolysis of anhydride groups contained in the copolymer.

23. The resinous binder of claim 1 wherein the dilution-enhancing polymer comprises copolymers of acrylonitrile, butadiene, acrylic acid and/or methacrylic acid.

24. The resinous binder of claim 23 wherein the dilution-enhancing polymer has a Mooney viscosity at 100° C. of at least 20.

25. The resinous binder of claim 23 wherein the dilution-enhancing polymer comprises between 0.5% and 15% acrylic and/or methacrylic units by weight.

26. The resinous binder of claim 23 wherein the dilution-enhancing polymer comprises from about 0.1% to 15% of the resinous binder.

27. The resinous binder of claim 24 wherein the dilution-enhancing polymer comprises from about 0.4% to 7% of the resinous binder.

28. The resinous binder of claim 25 wherein the dilution-enhancing polymer comprises about 2% of the resinous binder.

29. The resinous binder of claim 23 wherein the dilution-enhancing polymer further comprises one or more monomers selected from the group consisting of acrylamide, acrylic and methacrylic esters, styrene, alkyl styrenes, isoprene, cyclopentadiene, and alpha-olefins.

30. The resinous binder of claim 22 wherein the dilution-enhancing polymer further comprises between 0.5% and 15% acrylic and/or methacrylic acid units by weight.

31. The resinous binder of claim 28 wherein the dilution-enhancing polymer further comprises from about 0.1% to 15% of the resinous binder.

32. The resinous binder of claim 29 wherein the dilution-enhancing polymer further comprises one or more monomers selected from the group consisting of acrylamide, acrylic and methacrylic esters, styrene, alkyl styrenes, isoprene, cyclopentadiene, and alpha-olefins.

33. The resinous binder of claim 1 wherein the metal resinate is a zinc, calcium, magnesium, potassium, sodium, lithium, and/or aluminum salt of a modified rosin.

34. The resinous binder of claim 33 wherein the modified rosin is obtained from rosin, dimerized rosin, polymerized rosin or resins based on polymerizable hydrocarbon distillate feedstocks.

35. The resinous binder of claim 33 wherein the modified rosin is obtained from maleic anhydride, fumaric acid or acrylic acid reacted with rosin, dimerized rosin, polymerized rosin or resins based on polymerizable hydrocarbon distillate feedstocks.

36. A publication gravure ink comprising a mixture of;
  (i) a solvent,
  (ii) a colorant, and
  (iii) a resinous binder comprising;
    (a) a metal resinate, and
    (b) a dilution-enhancing polymer selected from the group consisting of copolymers of maleic anhydride and ethylene and copolymers of acrylonitrile, butadiene, acrylic and/or methacrylic acid,
wherein the dilution-enhancing polymer is present in the resinous binder in an amount which is effective to increase the dilution of the resinous binder in aromatic and nonaromatic solvents as compared to the dilution of the metal rosin resinate alone.

37. The publication gravure ink of claim 36 wherein the dilution-enhancing polymer comprises copolymers of maleic anhydride and ethylene.

38. The publication gravure ink of claim 36 wherein the dilution-enhancing polymer comprises carboxylic acid functionality obtained via hydrolysis of anhydride groups contained in the copolymers of maleic anhydride and ethylene.

39. The publication gravure ink of claim 36 wherein the dilution-enhancing polymer further comprises acrylic esters.

40. The publication gravure ink of claim 36 wherein the dilution-enhancing polymer further comprises one or more monomers selected from the group consisting of acrylic acid, acrylamide, acrylonitrile, methacrylic acid, methacrylic esters, styrene, alkylstyrenes, isoprene, butadiene, cyclopentadiene and alpha-olefins.

41. The publication gravure ink of claim 36 wherein the dilution-enhancing polymer has a weight average molecular weight of at least 20,000 Daltons.

42. The publication gravure ink of claim 36 wherein the dilution-enhancing polymer further comprises between approximately 0.5% and 15% maleic anhydride-based units by weight.

43. The publication gravure ink of claim 36 wherein the dilution-enhancing polymer comprises from about 0.1% to 15% of the resinous binder.

44. The publication gravure ink of claim 36 wherein the dilution-enhancing polymer comprises copolymers of acrylonitrile, butadiene, acrylic acid and/or methacrylic acid.

45. The publication gravure ink of claim 36 wherein the dilution-enhancing polymer has a Mooney viscosity at 100° C. of at least 20.

46. The publication gravure ink of claim 42 wherein the dilution-enhancing polymer comprises between 0.5% and 15% acrylic and/or methacrylic units by weight.

47. The publication gravure ink of claim 42 wherein the dilution-enhancing polymer comprises from about 0.1% to 15% of the resinous binder.

48. The publication gravure ink of claim 42 wherein the dilution-enhancing polymer further comprises one or more monomers selected from the group consisting of acrylamide, acrylic and methacrylic esters, styrene, alkyl styrenes, isoprene, cyclopentadiene, and alpha-olefins.

49. The publication gravure ink of claim 36 wherein the ink comprises from 20 to 30% binder, 5 to 10% colorant, and 60 to 75% solvent.

50. The publication gravure ink of claim 36 wherein the solvent is selected from the group consisting of toluene, lactol spirits and VM&P naphtha.

51. The publication gravure ink of claim 36 wherein the colorant comprises an organic pigment.

52. The publication gravure ink of claim 36 wherein the colorant comprises an inorganic pigment.

53. The publication gravure ink of claim 36 wherein the colorant comprises a soluble dye.

* * * * *